Patented Oct. 30, 1945

2,387,967

UNITED STATES PATENT OFFICE 2,387,967

TABBING CEMENT

Henry Zimmerman, St. Louis, Mo.

No Drawing. Application October 2, 1943,
Serial No. 504,723

2 Claims. (Cl. 260—32)

This invention relates to tabbing cement, a cement for coating and thereby cementing the edge of a block of paper to form a tablet or pad. A common use is to produce scratch pads and writing tablets. Another important use is to make pads of manifold forms.

The object of the invention is to produce a superior cement for this purpose.

The cement has as a base a polyvinyl acetate emulsion and a plasticizer to which is added an agent which materially increases the tenacity of a film formed from the cement comprising a polyhydroxy alcohol exemplified by glycol and glycerol.

The emulsion forming the base may be procured commercially. One such emulsion, Du Pont's polyvinyl acetate emulsion RH-460-A, has been found satisfactory and is preferred. That emulsion, Du Pont's RH-460-A, is a water emulsion of high viscosity polyvinyl acetate having 55% solids by weight and is described in publications by E. I. Du Pont de Nemours & Co., entitled "Water Emulsions of Polyvinyl Acetate, Properties and Applications," and "Technical Data Bulletin No. 4-243, Polyvinyl Acetate." There appears, however, to be no superior merits to this particular product which makes it critically better than other emulsions which may be purchased on the market or prepared by those skilled in the art.

Commercial emulsions of polyvinyl acetate are substantially standard with respect to consistency. They are like cream and are such that they work well as a paint with a brush. The addition of a plasticizer and of glycol or glycerol contemplated here is in such proportions as not to materially change the original consistency of the emulsion.

Many plasticizers are available and are well known in the art. Of these dibutyl phthalate is satisfactory.

For the added ingredient, glycol or glycerol is preferred. Glycol is a dihydroxy alcohol, and glycerol is a trihydroxy alcohol. Other polyhydroxy alcohols have characteristics similar to glycol and glycerol and may be substituted. The addition of this agent, exemplified by glycol and glycerol, produces an unobvious result. The tenacity of the film is material increased by this addition and it gives added resiliency to the film.

In preparing the cement preferred proportions are recommended. To one gallon of the emulsion is added 8 oz. of plasticizer, for example dibutyl phthalate, and 2 oz. of glycol or glycerol. As might be expected the degree of flexibility or softness may be regulated by changing the proportion of plasticizer added.

The cement prepared according to the typical proportions given has the consistency of a good oil paint, and may be applied readily by a paint brush. When it is applied to the edges of a stack of sheets, thirty minutes or less is allowed for drying, after which the stack may be cut readily by a guillotine, as is often desired.

One important advantage of the cement is its reaction when it is used on a block cut by a guillotine. It holds the block against distortion and does not break under such treatment, but its resiliency and tenacity hold together the parts of a severed block.

The film produced from the cement is little affected by atmospheric conditions. Extreme cold and extreme dryness adversely affects other known cements much more than that of the present invention. The film appears to wear well, to be little affected by age. No change in the film is noticed after standing three months.

A suitable film may be produced by a single application of the cement.

After a brush has been used in applying it, the brush may be washed clean in clear water with little effort. Every trace of the cement can be quickly removed in this manner in a few seconds.

When sheets secured at their edges are used in a typewriter, particles of the film do not stick, as some cements do, to the platen.

In fastening blocks of thin paper, as is often required with manifold sheets, the paper does not wrinkle or draw under the effect of the cement or its drying.

When sets of manifold sheets are blocked with the cement, one set may be severed from the block by a knife passing through the film beneath the set. The film on the severed set remains unbroken and is sufficiently strong to securely hold the sheets of the set together for any ordinary handling. No other cement is known with which this is possible, and this test or use demonstrates the superior characteristics of the cement of the present invention.

It is obvious from the foregoing description that the invention accomplishes its objects. Within the scope of the foregoing description and the appended claims various changes, substitutions or selections may be made in the specific components of the cement and changes may be made in the proportions while practicing the invention to obtain its intended results.

I claim:

1. A tabbing cement having as a base a water emulsion of polyvinyl acetate and a plasticizer to which is added an agent which materially increases the tenacity of a film formed from the cement comprising a polyhydroxy alcohol selected from the class consisting of glycol and glycerol.

2. A tabbing cement having as a base a water emulsion of polyvinyl acetate and a plasticizer to which is added an agent which materially increases the tenacity of a film formed from the cement comprising a polyhydroxy alcohol selected from the class consisting of glycol and glycerol, in the approximate proportion of one gallon emulsion, 8 ozs. plasticizer and 2 ozs. of said alcohol.

HENRY ZIMMERMAN.